United States Patent Office 3,267,603
Patented August 23, 1966

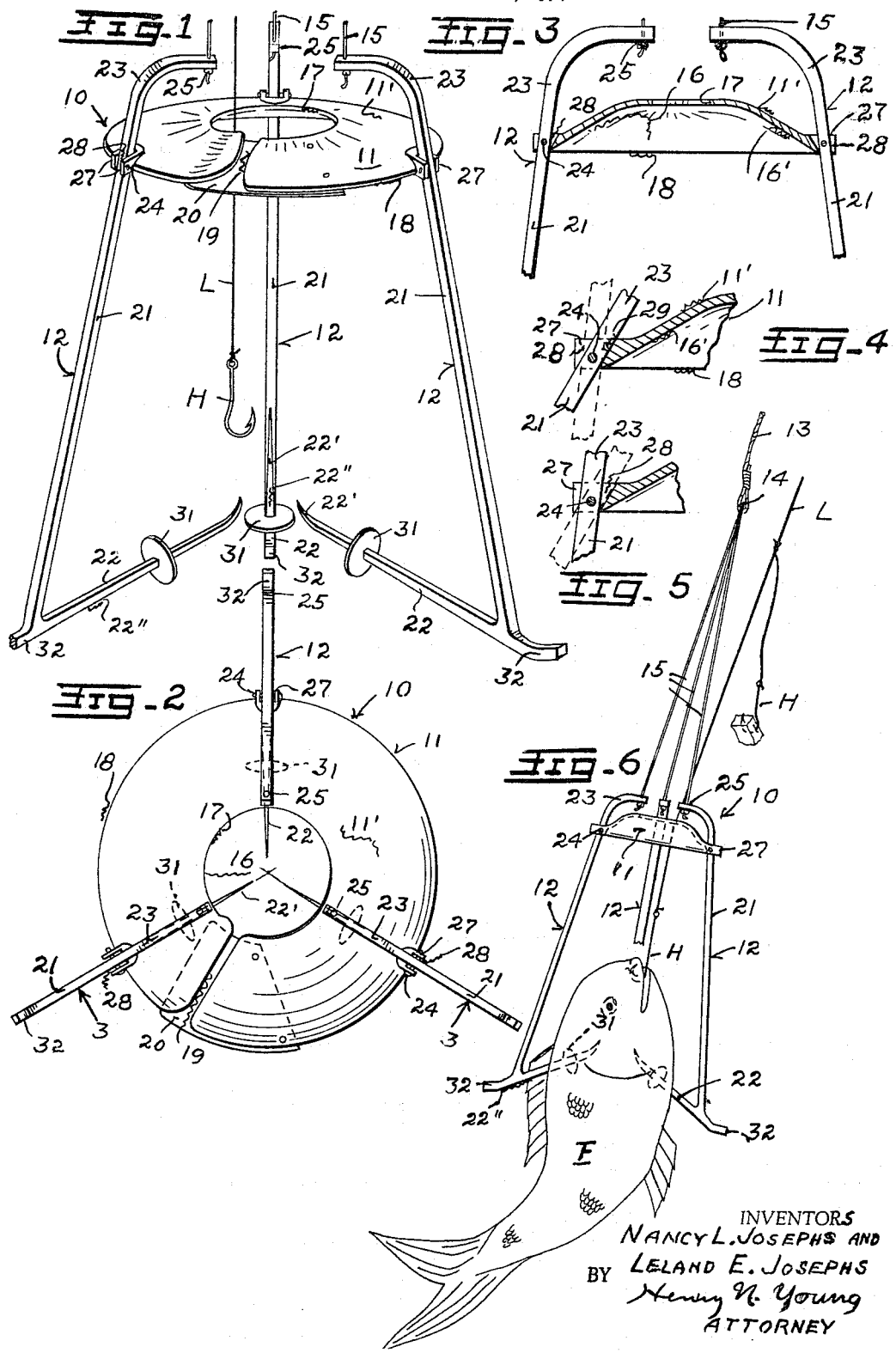

3,267,603
FISH GRAPPLE
Nancy L. Josephs and Leland E. Josephs, both of
1924 Courtland Ave., Oakland, Calif.
Filed June 29, 1964, Ser. No. 378,664
2 Claims. (Cl. 43—5)

The invention relates to a device for grappling an object and particularly a caught fish on a fishline.

In fishing wtih a fishline, and particularly for landing larger fish which are caught on a line which extends beneath the water surface from a boat or wharf or shore from which fishing is being conducted, it is usually desirable when a caught fish has been drawn to or adjacent the water surface to relieve the strain on the line and the fish-engaged hook or other fish-holding element thereof by the use of an independently supported gaffing or grappling device which is applied directly to the caught fish while the device guidedly receives the fishline therethrough, and the present general object is to provide an improved such fish-grappling unit for the purpose.

Another object is to provide a unitary fish-grappling device of the character described which is operatively and retainably engageable with a caught fish on a fishline by utilizing gravity.

A further object is to provide a unitary fish grapple having an assembly which is operatively retained in longitudinal alignment with the associated fishline while in use.

An added object is to provide a free axial disposal and movement of the fishing gear elements of a fishline engaged by the caught fish with respect to the present grapple.

Yet another object is to provide a unitary fish grapple of the present type having a minimum number of cooperative elements in its assembly.

The invention possesses other objects and features of advantage, some of which, with the foregoing, will be set forth or be apparent in the following description of a typical embodiment thereof, and in the accompanying drawings, in which, FIGURE 1 is a fragmentary side perspective view of a unitary fish grapple embodying the features of our invention as cooperatively associated with a terminal hook-providing portion of a fishline.

FIGURE 2 is a plan view of the structure of the grapple per se.

FIGURE 3 is a fragmentary section taken from the broken line 3—3 in FIGURE 2.

FIGURES 4 and 5 are enlarged fragmentary views of a portion of FIGURE 3 and illustrate, respectively, limiting spread and fish-engaging disposals of the shank of a grapple hook of the unit.

FIGURE 6 is a reduced perspective view showing the present grapple unit as operatively applied to a caught fish on a hook of the fishing tackle of a fishline.

Having in mind certain difficulties which have heretofore been found in the use of variously previously known gaffs or grapnels for grappling a fish F which has been hooked on a fishing line L for its removal from the water, the present unitary grapple unit has been designed for its particularly ready and efficient use during the landing and release of a hooked fish with respect to a fishline L which is terminally provided with fishing tackle usually including one or more fishhooks H, it being understood that such tackle may also include line-carried sinkers and/or floats.

As illustrated, a grapple unit 10 embodying the features and advantages of our invention comprises a rigid annular body 11 which pivotally mounts a symmetrical array of cooperative grapple hook elements 12 and is arranged for tis attachment to a flexible positioning control line 13 and has its rim portion connected to the hooks 12 at a common connecting eye 14 by links 15 while freely and retainedly receiving the fishline L through its axial opening or bore 16. The present grapple arrangement is essentially such that appropriate relative movements of the grapple unit 10 and a fishline L disposed through the bore 16 are arranged to effect a gripping engagement of the head portion of a caught fish F on the line in an effectively centered relation of the head of the fish F to the grapple hooks 12 carried by the body 11. Preferably, and as shown, the body bore 16 is symmetrically and conically tapered axially of the body with its smaller end defining a planar end edge 17 which is perpendicular to the axis of the bore, is disposed at the same side of the body as the ring 14, and is of a size which will allow the free passage therethrough of the line-mounted tackle assembly per se.

The larger end of the bore 16 is defined by a body edge 18 which defines a plane which is perpendicular to the axis of the bore 16 and preferably defines an angle of at least thirty degrees with the bore axis, whereby the tapered bore face 16′ between its ends is arranged to function as a funnelform centering guide for the line and its tackle elements and the head of a caught fish extending within the bore for its grappling. A lateral installation or removal of a line L with respect to the bore 16 is preferably facilitated by providing the one-piece body 11 of the grapple assembly 10 with a slot 19 provided more or less radially through the body from the body bore 16. A leaf spring 20 having one end fixed to a body end within the bore 16 spans and closes the slot 19 with its unattached end normally bearing against the bore face 16′ adjacent the opposite body end as a spring latch for its deflection to an inoperative position when the fishline is to be passed through the slot 19. As illustrated, the outer surface 11′ of the body may have a conformation which is generally complementary to that of the bore face 16′.

It will now be noted that the grapple hook elements 12 each comprise an intermediate shank portion 21 having terminal prong and control arm portions 22 and 23 respectively which are correspondingly directed from the shank portion to define a common plane and respectively define acute and obtuse angles of the order of forty-five degrees and one hundred thirty-five degrees with respect to the effective line of the shank portion 21 which coterminously and integrally connects junctures of the prong and control arm portions wtih the shank in a one-piece structure of suitably rigid material. As shown, each prong portion 22 is tapered from the shank 21 to a sharpened terminal point 22′ which is preferably barbless and is slightly curved toward the shank portion 21, and the control arm portion 23 has a more-or-less arched form and extends from a hinge pin 24 by which the shank is rockably attached to the body 11 at a peripheral point thereof while providing at its free end a suitable connection 25 for flexible or rigid tension or bridle links 15 which connect it with the common control line 13 through the ring 14, with said link connections shown as comprising eye holes for retainedly receiving corresponding ends of the attached link.

It will now be noted that the body 11 adjacent its peripheral end edge 18 similarly mounts a plurality of like grapple hooks 12 on the pins 24 at outwardly extending pairs of ears 27 which fixedly receive the hook-mounting hinge pin 24 through and between them, with the pins disposed in a common plane which is parallel to the plane of the body edge 18 whereby a swinging of the attached grapple hooks 12 is confined to planes which are parallel to the plane of the body edge 18 and are perpendicular to the axis of the bore 16. Preferably, and as shown, the inner end of the shank-receiving space 28 defined between each pair of the extending ears 27 provides a face 29 which slopes generally as the adjacent outer body face 11' and is so related to the opposed edge of the received hook shank portion and the axis of the opposed hinge pin 24 securing the shank to the body 11 that the bounding upper and lower edges of the faces 29 may respectively function as stops to limit the relative spreading of the grapple hooks 12 and prevent an undesirable inward movement of the hook points 22' as far as the axial line of the body bore 16, as is respectively indicated in FIGURES 4 and 5.

Recalling that the "landing" and release of a fish which has been caught by being hooked or otherwise attached to a fishline comprises the final fishing acts respecting the maintained catching of the fish, and that, particularly with larger fish, such procedures involve an added strain on the fishline and a secure manual holding of the fish before and during said acts, the present grapple unit meets the foregoing and other objects of facilitating the landing of a caught fish in a boat or on a pier or on a bank or even a beach, from which the fishline extends into fishing waters. In case the baited fishline L depends into the water from above as from the sides of a boat or pier or bank, with the line withdrawn and held to dispose a caught fish at or below the water surface, a fisherman may, while the line L is manually or otherwise held at a point thereof beyond the various tackle elements thereon, dispose a line portion between the tackle and the held point of the line in the bore 16 by displacing the latch spring 20 to effectively open the slot 19 while supporting the unit by the control line 13.

As a present grapple unit 10 is lowered along a depending fishline L engaged through its bore 16, the under edges 22" of the prongs 22 of the freely swinging grapple hooks 12 are adapted for their wedged engagement by the head of a hooked fish F for mutually swinging the grapple hooks 12 away from the axial line of the bore 16 of the hook-supporting body 11 to open the grapple against the action of gravity until the prong points 22' engage the fish at appropriately spaced points about it. When the grapple has been sufficiently opened about a fish, an upward jerking of the control line 13 will initially engage the prong points 22' in the fish, and the actions of gravity and the wriggling motion of the caught fish will cooperatively set the grapple prongs with respect to the fish and thereafter permit a release of the fishline from the grapple bore 16 through the slot 19 and the subsequent functioning of the grapple as the sole landing means for the gripped fish.

Desirably, and as shown, the prong portions 22 of the grapple hooks 12 may fixedly or adjustably mount suitable mount suitable stop members 31, comprising annular discs or collars, at such a distance from the prong points 22' as to provide for a gripping of a grappled fish while preventing an undue mutilating of the fish by the penetrating portions of the engaged prong points. Thereafter, a manual unhooking release of the grapple-gripped fish is permitted at desired deposit points for the fish, with the release of the engaged fish facilitated by both the barbless nature of the hook points 22' and the limited penetration of the hook prongs by reason of the functioning of the stop members 31.

The present grapple unit 10 is also adapted for its operative engagement with a caught fish at the tackle end of a fishline which has been suitably cast from a beach sloping into fishing water. In such a case, when a fish has been caught by the tackle of a cast fishline which may be drawn along said bottom, a present grapple unit which has been engaged about the line and is disposed at an underwater or adjacent strand point for its gravitally positioned engagement with the beach, may have the caught fish drawn by the use of the fishline into the positioned unit for a spread engagement of its grapple hooks about the head of the fish, after which the control line 13 may be utilized to drag the fish-gripping grapple onto the shore for a subsequent release of the fish from the fishline and the grapple hooks of the unit.

For facilitating a more-or-less anchored engagement of a present grapple unit 10 in the material of a beach laterally supporting the unit on two of its hooks, the grapple hooks may be provided with extensions 32 directed oppositely from the prong portions 22 in line therewith, whereby the extensions 32 of two of the grapple hooks 12 may support the unit from the beach material in a more-or-less anchored relation thereto while otherwise providing continuations of the inwardly tapering guide edges 22" of the prongs 22.

It is also to be noted that the present grapple unit is generally adapted or adaptable for use in removing an inanimate object from the bottom of a body of water by the use of an installed line leading to the object for guiding an engaged grapple of the present type into position for a gripping and landing of the object in the general manner taught for its use in the fishing art.

From the foregoing description taken in connection with the accompanying drawings, the advantages of the present fish grapple will be readily understood by those skilled in the art to which the invention appertains, it being understood that the present showing is primarily illustrative, and that such changes and developments may be made, when desired, as fall within the scope of the following claims:

We claim:

1. For cooperation with a fishing line having terminal fishing tackle including a fishhook operatively engaging a caught submerged fish, a grapple comprising a rigid body member including an annular ring adapted to freely receive the fishing tackle through its bore, a plurality of like planar grapple hook members each having an intermediate shank portion connecting piercing prong and lever arm portions coterminous with opposite ends of the shank portion, means hingedly connecting said shank portions of the hook members to the body at symmetrically related peripheral body points for limited gravity biased free swinging of the hook members about axes parallel to the peripheral plane of the body member, and a positioning control and pull line for the grapple connected to said arm portions and operative axially of the body member, said prong portions being directed obliquely toward both the axis and plane of the body opening to provide for a mutual wedging separation of the prongs by the engaged head of the caught fish and a grappling penetration of the prongs in the fish by reason of a continued relative movement of the fish and grapple body toward each other by said control line, and said hook prongs mounting stop members in spaced relation from the prong points for limiting the penetration of the prongs with respect to a grappled fish.

2. For cooperation with a fishing line having terminal fishing tackle including a fishhook operatively engaging a caught submerged fish, a grapple comprising a rigid body member including an annular ring adapted to freely receive the fishing tackle through its bore, a plurality of like planar grapple hook members each having an intermediate shank portion connecting piercing prong and lever arm portions coterminous with opposite ends of the shank portion, means hingedly connecting said shank portions of the hook members to the body at symmetrically related peripheral body points for the limited gravity biased free swinging of the hook members about axes parallel to the peripheral plane of the body member, and a positioning control and pull line for the grapple connected to said arm portions and operative axially of the body member, said prong portions being directed obliquely toward both the axis and plane of the body opening to provide for a mutual wedging separation of the prongs by the engaged head of the caught fish and a grappling penetration of the prongs in the fish by reason of a continued relative movement of the fish and grapple body toward each other by said control line, and said grapple hook members being provided with extensions directed oppositely from and in general alignment with the prong portions thereof.

References Cited by the Examiner

UNITED STATES PATENTS

| | | | |
|---|---|---|---|
| 521,963 | 6/1894 | Nason | 294—106 |
| 2,235,371 | 3/1941 | Jyrkas | 43—5 |

FOREIGN PATENTS

| | | |
|---|---|---|
| 899,445 | 8/1944 | France. |

SAMUEL KOREN, *Primary Examiner.*

ABRAHAM G. STONE, *Examiner.*

W. H. CAMP, *Assistant Examiner.*